Patented Oct. 5, 1943

2,331,169

UNITED STATES PATENT OFFICE 2,331,169

ESTERS OF METHYLOL PHENOLS

Herman A. Bruson, Philadelphia, Pa., assignor to The Resinous Products & Chemical Company, Philadelphia, Pa.

No Drawing. Application May 9, 1940, Serial No. 334,171

7 Claims. (Cl. 260—405)

This invention relates to condensation products obtained by heating an esterified phenol having at least one acyloxymethyl group attached to the aromatic nucleus, and a carboxylic acid having a boiling point higher than that of the acid corresponding to the acyl radical of the acyloxymethyl group. It also relates to a process for preparing these compounds.

In copending application Serial No. 272,804, filed May 10, 1939, which on December 9, 1941, issued as U. S. Patent No. 2,265,141, it is shown that tertiary aminomethyl phenols, obtained by condensing a phenol, formaldehyde and a secondary amine, are converted to acyloxymethyl phenol esters by heating them with the anhydride of a carboxylic acid. An example of this type of esterified phenol is 2,4,6-tris-(acetoxymethyl)-phenyl acetate having the formula:

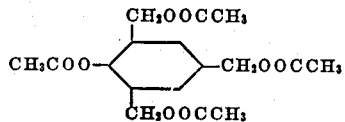

It has been found that, when these esterified phenols having acyloxymethyl groups attached to the aromatic nucleus are heated with carboxylic acids having a higher boiling point than the acid corresponding to the acyl radical attached to the methylene group, this acyl radical is replaced by the acyl radical of the higher boiling acid. For example, if the 2,4,6-tris-(acetoxymethyl)-phenyl acetate is heated with three molecular equivalents of stearic acid, acetic acid will be evolved and 2,4,6-tris(stearoylmethyl)-phenyl acetate will be formed. If only one or two molecular equivalents of stearic acid are used, the corresponding mono- or di-stearoyl compound will be formed. In practically all cases the carboxyl radical which is attached directly to the aromatic ring remains intact although there is some evidence that under certain conditions part of the initial material may be attacked at this point also. In general each lower acyl group of the acyloxymethyl radical is replaceable by a molecular equivalent of the higher boiling acid employed.

The aromatic nucleus of the esterified phenol may be mono- or poly-cyclic and in the latter case may be a condensed ring system or separate rings joined by a carbon, sulfur, or oxygen bridge. The aromatic nucleus may also have other substituents such as alkyl, aryl, aralkyl, cycloalkyl, alkoxy and carboxy radicals or halogen atoms. The acyl radical of the acyloxymethyl group is derived from a monobasic acid, preferably an aliphatic acid having less than eight carbon atoms. The acyloxy radical which is attached directly to the nucleus may be monobasic or polybasic. In the latter case all of the carboxyl groups of the acid are esterified by the phenol. The preferred compounds are those in which the aromatic nucleus is selected from the benzene, diphenyl or naphthalene series having one or more esterified phenolic hydroxyl groups.

The following compounds are typical of those which may be employed according to the invention:

2,4,6-tris-(acetoxymethyl)-phenyl acetate.

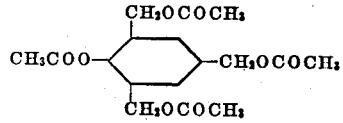

2,4,6-tris-(acetoxymethyl)-m-cresyl acetate

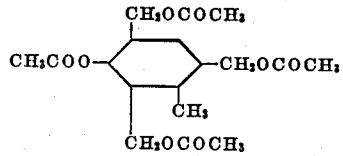

3-(acetoxymethyl)-4,4'-bis-(acetoxy)-diphenyl dimethyl methane

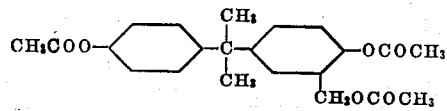

2,5-bis(acetoxymethyl)-1,4-diacetoxybenzene

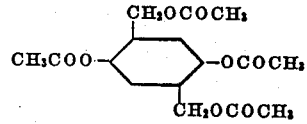

3-(acetoxymethyl)-4-acetoxydiphenyl

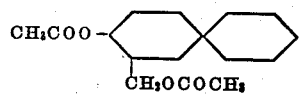

1-(acetoxymethyl)-2-acetoxy-naphthalene

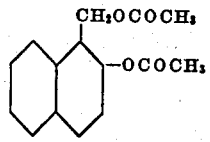

3,5-bis-(acetoxymethyl)-4-acetoxyphenyl isobutane

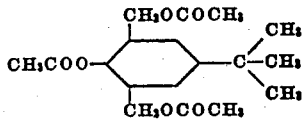

Bis-(2,2'-acetoxymethylphenyl)-succinate

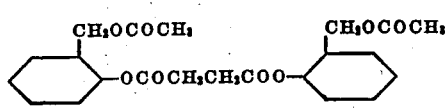

2-acetoxymethyl-phenyl stearate

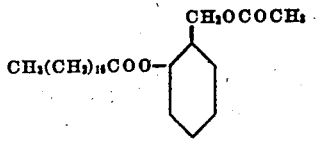

Bis-(2,2'-acetoxymethylphenyl)-phthalate

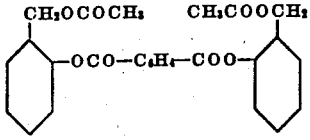

2-acetoxymethyl-phenyl oleate

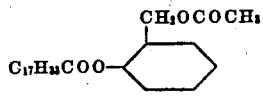

2,6-bis-(benzoyloxymethyl)-p-cresyl benzoate

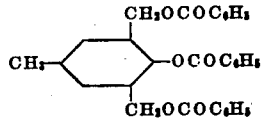

2,6-bis-(acetoxymethyl)-4-benzyl-phenyl acetate

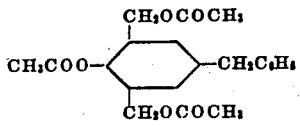

2-propionyloxymethyl-phenyl crotonate

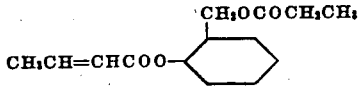

3,5,3',5'-tetra-(acetoxymethyl)-4,4'-bis-(acetoxy)-diphenyl dimethyl methane

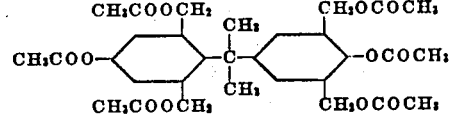

3-(acetoxymethyl)-4,4'-bis-acetoxy-benzophenone

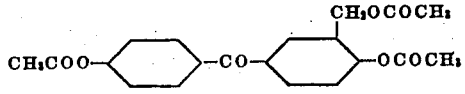

3-(acetoxymethyl)-4,4'-bis-acetoxy diphenyl sulfone

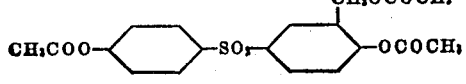

3-(acetoxymethyl)-4,4'-bis-acetoxy diphenyl cyclohexane

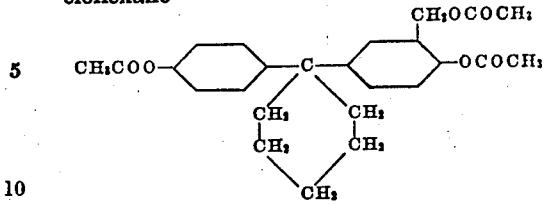

3,5-bis-(acetoxymethyl)-4-acetoxy-butyl benzoate

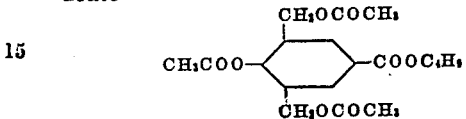

The carboxylic acids which may be employed include those of the aromatic, hydroaromatic, naphthenic and the higher aliphatic series. In the case of the aliphatic acids, those containing eight or more carbon atoms are preferred but the invention is not restricted to these because any carboxylic acid having a higher boiling point than the acid corresponding to the acyl radical of the acyloxymethyl group may be employed. The acids may be mono- or poly-basic, saturated or unsaturated. They may also contain nuclear substituents, such as hydroxy, alkoxy, aryloxy, or halogen groups. Examples of such acids are: Lauric, myristic, palmitic, stearic, montanic, cerotic, mellisic, undecylenic, behenic, erucic, oleic, ricinoleic, linoleic, linolenic, licanic, elaeostearic, undecadienic, tetrahydroabietic, clupanodonic, naphthenic, anisic, p-hydroxy benzoic, cinnamic, octylphenoxyacetic, succinic, adipic, azelaic, sebacic, homophthalic. These may be used individually or in admixture with each other. Acids which are obtained by the addition of $\alpha,\beta$-unsaturated acids or anhydrides to olefines, terpenes, or olefinic acids by the Diels-Alder synthesis may be used, examples of which are the maleic anhydride adducts of terpenene, abietic acid, elaeostearic acid and the like.

The reaction is carried out in general by heating a mixture of an esterified phenol having one or more acyloxymethyl groups attached to the nucleus with any of the carboxylic acids to temperatures of 200-300° C., preferably 240 to 285° C. Depending on the molecular ratio of the reactants part or all of the acyl radical of the acyloxymethyl group can be replaced. The reaction may be carried out at ordinary, reduced, or superatmospheric pressure according to the boiling points of the reactants. Small amounts of metal oxides, hydroxides, or alkoxides of the alkali metals, the alkaline earth metals or heavy metals act as accelerators in the condensation, as do the halides of amphoteric metals and rosin. For example, small amounts (0.5 to 1.0%) of sodium ethylate, zinc oxide, litharge, zinc chloride or rosin cause the condensation to proceed more rapidly at lower temperatures (175 to 200° C.)

The products obtained are oily, waxy or resinous depending on the nature of the reactants, particularly the nature of the acid, and the molecular proportions employed. Saturated acids such as stearic, montanic or cerotic tend to yield waxy materials whereas the acids of drying oils such as those of linseed, oiticica, fish oil, or tung oil yield materials of oily nature which tend to air-dry and form hard films. Mixtures of the acids may also be used to obtain products of intermediate character or the reaction may be carried out first with one acid and then with another in any desired ratios. With unsaturated acids of the drying oil type there is some evidence that part at least of the condensation takes place in the chain of the acid leaving the carboxyl group free. In such cases the final product has a higher acid number than the products obtained from saturated acids and the free carboxyl groups can be esterified with glycerine or other polyhydric alcohol to form new alkyd resins.

Part of the carboxylic acid may be replaced by a drying oil such as linseed oil, tung oil, or fish oils in order to obtain products of lower acid number than can be obtained with the acid alone. When monobasic acids and linseed oil are employed, the product is an oil which dries on exposure to the air and forms a hard, tough film. When a dibasic acid such as adipic acid is used, the product is readily convertible to an insoluble, rubbery gel even when a mixture of the adipic acid and a drying oil or a monobasic acid is employed.

The following examples will serve to illustrate the invention. The condensations described in these examples are carried out by heating and stirring the reaction mass in an atmosphere of carbon dioxide under a reflux condenser attached to a trap so as to collect and measure the volatile acid evolved. Open vessels may be employed if the volatile acids are not to be recovered.

Example 1

A mixture of 85.2 grams of stearic acid (0.3 mol) and 35.2 grams of 2,4,6-tris-(acetoxymethyl)-phenyl acetate (0.1 mol) is heated three hours at 250 to 255° C. During this time 18 grams (0.3 mol) of acetic acid distills off. The product is a wax-like material having an acid number 15. It is readily soluble in petroleum distillates, lubricating oil, or varnish compositions.

Example 2

A mixture of 28.4 grams (0.1 mol) of stearic acid and 35.2 grams (0.1 mol) of 2,4,6-tris-(acetoxymethyl)-phenyl acetate is heated at 250 to 255° C. for one hour. 12 cc. of acetic acid distills out leaving a dark oily product. Heating this product for one hour more at 250° C. evolves an additional 2.5 cc. of acetic acid and the oil is transformed to a tough, rubbery mass.

The stearic acid in the foregoing examples may be replaced by a molecularly equivalent amount of other saturated acids such as lauric, myristic, palmitic, mellisic, cerotic or montanic acid to obtain similar oily, waxy or resinous products.

Example 3

A mixture of 861 grams (3 mols) of linseed oil mixed fatty acids (acid No. 196) and 352 grams (1 mol) of 2,4,6-tris-(acetoxymethyl)-phenyl acetate is heated for five hours at 245 to 255° C. 185 grams of acetic acid is evolved leaving an amber-colored oil, weighing 1010 grams and having the following constants: acid No. 28, iodine No. 127, saponification No. 188.5, viscosity "Z" (Gardner-Holdt scale).

This oil dries more rapidly than linseed oil and is valuable in the preparation of paints, varnishes, alkyd resins, linoleum, printing inks, and other oleoresinous compositions. On longer heating at 250 to 285° C. the oil thickens rapidly and finally forms a gel similar to linoxyn.

Example 4

A mixture of 287 grams (1 mol) of linseed oil fatty acids and 352 grams (1 mol) of 2,4,6-tris-(acetoxymethyl)-phenyl acetate is heated for several hours at about 250° C. during which time one mol of acetic acid is evolved. The product is an amber colored oil which on further heating at 250° C. rapidly polymerizes to a stiff, insoluble gel.

In a similar manner oiticica oil fatty acids (licanic acid) react with 2,4,6-tris-(acetoxymethyl)-phenyl acetate to yield a resinous composition.

Example 5

A mixture of 90 grams (0.3 mol) of octadecadienic acid (acid No. 190) and 35 grams of 2,4,6-tris-(acetoxymethyl)-phenyl acetate is heated one hour and forty-five minutes at 250 to 255° C. during which time 20 cc. of acetic acid is evolved. The product is a viscous amber-colored oil having an acid number 22.4. On exposure to air it dries rapidly, with or without a siccative, to a clear, non-frosting film resembling bodied tung oil. It may be used as a vehicle for paints and varnishes. On longer heating at 250° C. it is converted to a stiff, insoluble gel.

The octadecadienic acid used in this example is obtained by the catalytic dehydration of ricinoleic acid and is sold under the trade name of "Isoline" fatty acids.

The drying oil acids in Examples 4 and 5 may be replaced by the acids of soya bean oil, rapeseed oil, tung oil, fish oils, oiticica oil, or other drying or semi-drying oils to yield oily, air-drying compositions which gel on further heating. By using two mols of the fatty acid per mol of 2,4,6-tris-(acetoxymethyl)-phenyl acetate, two mols of acetic acid are eliminated and oily, air-drying compositions obtained. These compositions all have a low acid number which can be reduced to less than 4 by heating with glycerol or a glycol and the resulting product can be used in the preparation of alkali-resistant coatings and for pigmenting with basic pigments by methods known in the paint and varnish industry.

In a similar manner the fatty acids of non-drying oils such as of olive, castor, corn or cottonseed oil yield oily compositions useful as plasticizers.

Example 6

A mixture of 114.8 grams (0.4 mol) of octadecadienic acid (acid No. 196) and 35.2 grams (0.1 mol) of 2,4,6-tris-(acetoxymethyl)-phenyl acetate is heated for five hours at 250 to 260° C. during which time 22.4 grams of acetic acid is evolved. The product is a viscous oil having an acid number 40. This example shows that by using more than 0.3 mol of the acid some of the original material is attacked by the octadecadienic acid at the carboxyl group directly attached to the benzene ring as well as at the acetoxymethyl groups. If all of the material had been attacked in this manner, 24 grams of acetic acid would have been evolved. The high acid number of the final product indicates that the condensation takes place in part at the double bonds of the acid radical.

Example 7

A mixture of 35.2 grams (0.1 mol) of 2,4,6-tris-(acetoxy-methyl)-phenyl acetate, 55.2 grams (0.2 mol) of linseed oil fatty acids and 27.6 grams of linseed oil is heated for three and one-half hours at 250–260° C. during which time 14 grams of acetic acid is evolved (theory, 18 grams). The product is a pale yellow, viscous oil having an acid number 15. It is soluble in petroleum naphtha and dries rapidly to a soft film. It may be used as a varnish or paint vehicle. When heated for a further 30 minutes at 250° C., it forms an insoluble, rubbery mass.

Example 8

A mixture of 35.2 grams (0.1 mol) of 2,4,6-tris-(acetoxymethyl)-phenyl acetate, 14.6 grams (0.1 mol) of adipic acid and 28.4 grams (0.1 mol) of stearic acid is heated at 250 to 255° C. At the end of 35 minutes heating, 14 cc. of acetic acid is evolved and the oily product sets to an insoluble, rubbery mass.

Example 9

A mixture of 35.2 grams (0.1 mol) of 2,4,6-tris-(acetoxymethyl)-phenyl acetate, 14.6 grams (0.1 mol) of adipic acid and 27.6 grams (0.1 mol) of linseed oil fatty acids is heated at 250° C. At the end of one hour 11 cc. of acetic acid is evolved and the oily product sets to an insoluble, rubbery mass.

Example 10

A mixture of 35.2 grams (0.1 mol) of 2,4,6-tris-(acetoxymethyl)-phenyl acetate and 84.6 grams of oleic acid (0.3 mol) is heated at 255 to 260° C. for three and one-quarter hours, during which time 18 grams of acetic acid is evolved. The residual product is a pale red oil having an acid No. 16.8.

Example 11

A mixture of 35.2 grams (0.1 mol) of 2,4,6-tris-(acetoxymethyl)-phenyl acetate and 85.8 grams of elaeostearic acid (0.3 mol) is heated at 250 to 255° C. for two and one-half hours, during which time 18 grams of acetic acid distills off. The product is a pale amber-colored oil. Acid No. 27. It dries rapidly to a varnish-like film.

Example 12

A mixture of 35.2 grams (0.1 mol) of 2,4,6-tris-(acetoxymethyl)-phenyl acetate and 95 grams of tetrahydro-abietic acid (0.3 mol) is heated at 250 to 260° C. for three and one-half hours during which time 18 grams of acetic acid distills over. The residual product is a pale yellow, resinous mass which is soluble in toluene.

In the above examples the 2,4,6-tris-(acetoxymethyl)-phenyl acetate used may be replaced by any of the other acyloxymethyl derivatives of esterified phenols, naphthols, or hydroxy-diphenyls mentioned hereinabove or mixtures thereof. In all cases the mol ratios of the reactants will be determined by the number of acyloxy groups of the esterified phenol which are to be replaced by the acyl groups of the higher boiling acid.

I claim:

1. The composition of matter obtained by reacting by heating together an esterified phenol nuclearly substituted by at least one acyloxymethyl group of not over eight carbon atoms and a drying oil fatty acid until the original acyl group of the said acyloxymethyl group has been substantially replaced.

2. The composition of matter obtained by reacting by heating together 2,4,6-tris(acetoxymethyl) phenyl acetate and a drying oil fatty acid until the acetyl group of the acetoxymethyl groups has been substantially replaced.

3. The composition of matter obtained by reacting by heating together 2,4,6-tris(acetoxymethyl) phenyl acetate and linseed oil fatty acid until the acetyl group of the acetoxymethyl groups has been substantially replaced.

4. The composition of matter obtained by reacting by heating together 2,4,6-tris(acetoxymethyl) phenyl acetate and tung oil fatty acid until the acetyl group of the acetoxymethyl groups has been substantially replaced.

5. The composition of matter obtained by reacting by heating together 2,4,6-tris(acetoxymethyl) phenyl acetate and dehydrated castor oil fatty acid until the acetyl group of the acetoxymethyl groups has been substantially replaced.

6. The composition of matter obtained by reacting by heating together an esterified phenol nuclearly substituted by at least one acyloxymethyl group of not over eight carbon atoms and an organic carboxylic acid having a boiling point higher than that of the acid corresponding to the acyl portion of the said acyloxymethyl group until the original acyl group thereof has been substantially replaced.

7. The composition of matter obtained by reacting by heating together an esterified phenol nuclearly substituted by at least one acyloxymethyl group of not over eight carbon atoms and a higher aliphatic unsaturated carboxylic acid until the original acyl group of the said acyloxymethyl group has been substantially replaced.

HERMAN A. BRUSON.